(12) United States Patent
Kojima et al.

(10) Patent No.: US 9,905,862 B2
(45) Date of Patent: Feb. 27, 2018

(54) FUEL CELL

(71) Applicant: HONDA MOTOR CO., LTD., Tokyo (JP)

(72) Inventors: Hidetada Kojima, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/435,301

(22) Filed: Feb. 17, 2017

(65) Prior Publication Data

US 2017/0237085 A1    Aug. 17, 2017

(30) Foreign Application Priority Data

Feb. 17, 2016   (JP) ................................. 2016-027593

(51) Int. Cl.

| H01M 8/0265 | (2016.01) |
|---|---|
| H01M 8/026 | (2016.01) |
| H01M 8/0273 | (2016.01) |
| H01M 8/1004 | (2016.01) |
| H01M 8/1018 | (2016.01) |

(52) U.S. Cl.
CPC ......... *H01M 8/0265* (2013.01); *H01M 8/026* (2013.01); *H01M 8/0273* (2013.01); *H01M 8/1004* (2013.01); *H01M 2008/1095* (2013.01); *H01M 2250/20* (2013.01); *Y02T 90/32* (2013.01)

(58) Field of Classification Search
CPC ............................ H01M 8/0265; H01M 8/026
See application file for complete search history.

(56) References Cited

FOREIGN PATENT DOCUMENTS

JP          5824575 B2      9/2013

*Primary Examiner* — Olatunji Godo
(74) *Attorney, Agent, or Firm* — Mori & Ward, LLP (57) ABSTRACT

A fuel cell includes a resin-framed membrane electrode assembly, first and second separators, and a resin frame member. The resin frame member is provided to surround an outer periphery of a solid polymer electrolyte membrane. The first and second separators sandwich the resin-framed membrane electrode assembly therebetween in a stacking direction to define a reactant gas flow channel between each of the first and second separators and the resin-framed membrane electrode assembly. The first and second separators include a reactant gas manifold hole which passes through the first and second separators in the stacking direction. The resin frame member includes a bridge portion having connecting flow channels connecting the reactant gas flow channel and the reactant gas manifold hole. At least one of the connecting flow channels has a sloped surface.

7 Claims, 8 Drawing Sheets

FUEL CELL

CROSS-REFERENCE TO RELATED APPLICATIONS

The present application claims priority under 35 U.S.C. § 119 to Japanese Patent Application No. 2016-027593, filed Feb. 17, 2016, entitled "Fuel Cell". The contents of this application are incorporated herein by reference in their entirety.

BACKGROUND

1. Field

The present application relates to a fuel cell.

2. Description of the Related Art

In general, a solid polymer-type fuel cell includes a solid polymer electrolyte membrane formed of a polymer ion exchange membrane. The fuel cell is equipped with an electrolyte membrane-electrode assembly (MEA) in which an anodic electrode is disposed on one of the surfaces of the solid polymer electrolyte membrane and a cathodic electrode is disposed on the other surface of the solid polymer electrolyte membrane. The anodic electrode and the cathodic electrode each include a catalyst layer (electrode catalyst layer) and a gas diffusion layer (porous carbon).

The MEA sandwiched between separators (bipolar plates) constitutes a power generation cell (unit fuel cell). A particular number of power generation cells are stacked and used as a vehicle-mount fuel cell stack, for example.

A fuel cell often includes an inner manifold in order to supply reactant gas, namely, fuel gas and oxidant gas, to the anodic electrodes and the cathodic electrodes of the respective power generation cells that are stacked.

The inner manifold has reactant gas inlet manifold holes (fuel gas inlet manifold holes and oxidant gas inlet manifold holes) and reactant gas outlet manifold holes (fuel gas outlet manifold holes and oxidant gas outlet manifold holes) that penetrate in the stacking direction of the power generation cell. A reactant gas inlet manifold hole is in communication with the inlet side of a reactant gas flow channel (fuel gas flow channel or oxidant gas flow channel) through which reactant gas is supplied along the electrode surface, and a reactant gas outlet manifold hole is in communication with the outlet side of the reactant gas flow channel.

In this case, the reactant gas inlet manifold hole and the reactant gas outlet manifold hole are connected to the reactant gas flow channel via connecting flow channels that have parallel grooves and the like in order to smoothly and uniformly supply the reactant gas. In order to enable smooth sealing without clogging the connecting flow channels, a fuel cell is proposed in Japanese Patent No. 5824575, for example.

According to this fuel cell, the MEA is a resin-framed MEA that includes a resin frame member around the outer periphery of the MEA. The resin frame member has such an outer shape that the resin frame member is disposed on the inner side of the reactant gas manifold holes formed in the outer periphery of the metal separators. The resin frame member is equipped with a buffer portion positioned outside the power generation region and connected to the reactant gas flow channel and a part of the connecting flow channel (bridge portion) that connects the buffer portion to the reactant gas manifold hole.

The document describes that since a resin frame member having relatively high rigidity is used, the resin frame member is prevented from being deformed and clogging of the connecting flow channel can be reliably prevented with a simple and economic structure.

SUMMARY

According to one aspect of the present invention, a fuel cell includes a resin-framed membrane electrode assembly and separators. The resin-framed membrane electrode assembly includes a solid polymer electrolyte membrane, electrodes disposed on both surfaces of the solid polymer electrolyte membrane, and a resin frame member that surrounds an outer periphery of the solid polymer electrolyte membrane. The separators stacked on two sides of the resin-framed membrane electrode assembly. Each of the separators includes a reactant gas flow channel through which reactant gas is distributed along an electrode surface and a reactant gas manifold hole through which the reactant gas is distributed in a stacking direction of the resin-framed membrane electrode assembly and the separators. The resin frame member includes a bridge portion that connects the reactant gas flow channel to the reactant gas manifold hole. The bridge portion includes a plurality of connecting flow channels that connect the reactant gas flow channel to the reactant gas manifold hole. The connecting flow channels each have a sloped surface at a bottom thereof.

According to another aspect of the present invention, a fuel cell includes a resin-framed membrane electrode assembly, first and second separators, and a resin frame member. The resin-framed membrane electrode assembly includes a solid polymer electrolyte membrane, first and second electrodes, and the resin frame member. The first and second electrodes sandwich the solid polymer electrolyte membrane therebetween in a stacking direction. The resin frame member is provided to surround an outer periphery of the solid polymer electrolyte membrane. The first and second separators sandwich the resin-framed membrane electrode assembly therebetween in the stacking direction to define a reactant gas flow channel between each of the first and second separators and the resin-framed membrane electrode assembly. The first and second separators include a reactant gas manifold hole which passes through the first and second separators in the stacking direction. The resin frame member includes a bridge portion having connecting flow channels connecting the reactant gas flow channel and the reactant gas manifold hole. At least one of the connecting flow channels has a sloped surface along a flow direction of reactant gas from the reactant gas manifold hole toward the reactant gas flow channel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
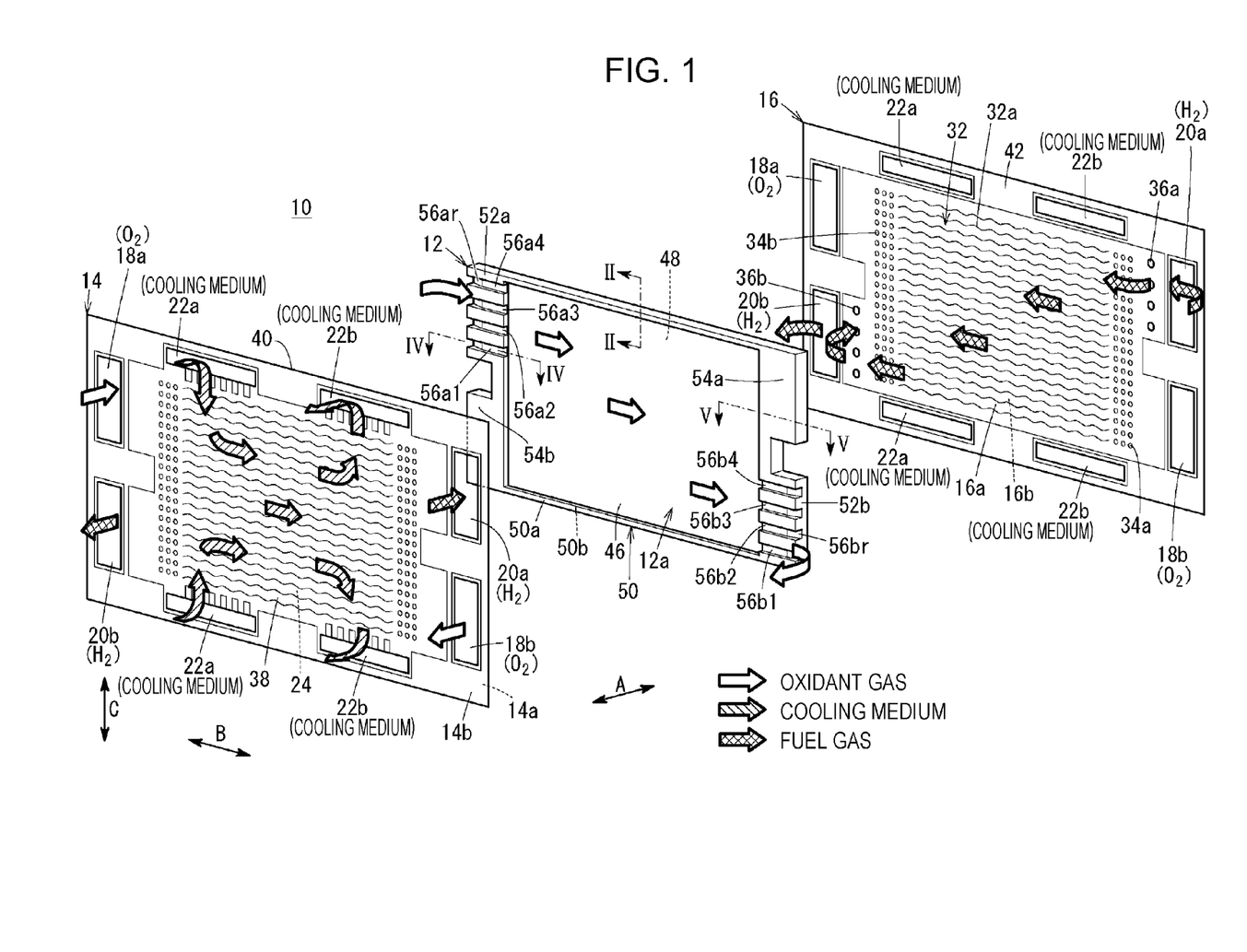
FIG. 1 is an exploded perspective view of a related part of a power generation cell according to a first embodiment of the present application.
Figure 2:
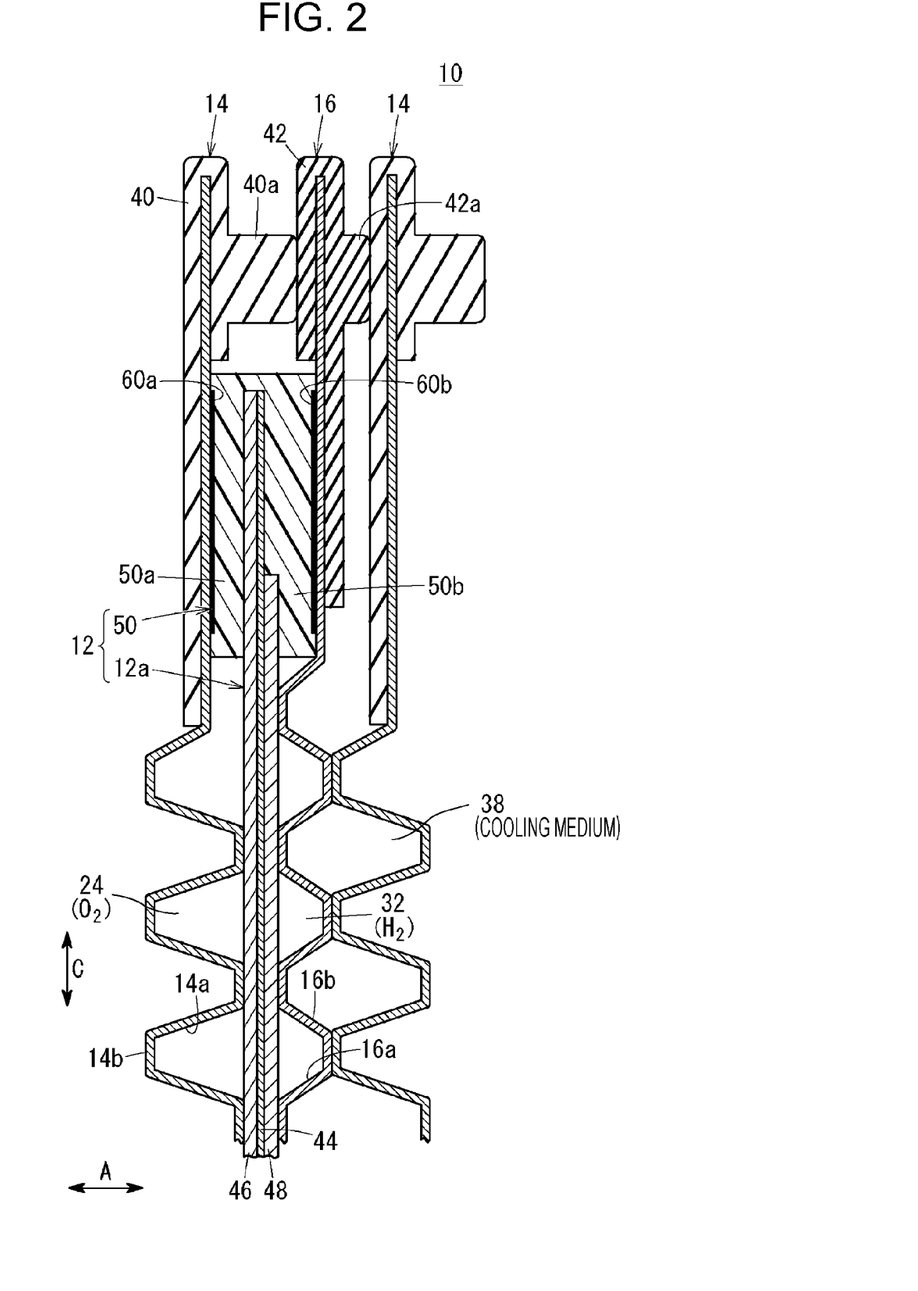
FIG. 2 is a sectional view of the power generation cell taken along line II-II- in FIG. 1.

Referring to FIGS. 1 and 2, multiple power generation cells (fuel cells) 10 according to a first embodiment of the present application are stacked in the arrow A direction (horizontal direction) or the arrow C direction (gravitational direction), for example, to form a fuel cell stack. The fuel cell stack is, for example, used as a vehicle-mount fuel cell stack mounted onto a fuel cell electric vehicle (not illustrated in the drawing).

Each power generation cell 10 includes a resin-framed MEA 12, and a first metal separator 14 and a second metal separator 16 between which the resin-framed MEA 12 is sandwiched. The first metal separator 14 and the second metal separator 16 each have a horizontally long (or vertically long) rectangular shape and their outer dimensions are larger than the outer dimension of the resin-framed MEA 12 (refer to FIG. 1).

The first metal separator 14 and the second metal separator 16 each include a metal thin sheet such as a steel sheet, a stainless steel sheet, an aluminum sheet, a plated steel sheet, or any of the foregoing with its metal surface subjected to an anti-corrosion treatment. The metal thin sheet is press-formed so as to have a corrugated cross section. Alternatively, for example, carbon separators may be used instead of the first metal separator 14 and the second metal separator 16.

In each of the first metal separator 14 and the second metal separator 16, reactant gas manifold holes, namely, an oxidant gas inlet manifold hole 18a and a fuel gas outlet manifold hole 20b, are formed at one end portion in the arrow B direction, which is the long side direction of each separator. The oxidant gas inlet manifold hole 18a of the first metal separator 14 and the oxidant gas inlet manifold hole 18a of the second metal separator 16 are in communication with each other in the arrow A direction. The fuel gas outlet manifold hole 20b of the first metal separator 14 and the fuel gas outlet manifold hole 20b of the second metal separator 16 are in communication with each other in the arrow A direction. The oxidant gas inlet manifold holes 18a are used to supply the oxidant gas (reactant gas), for example, oxygen-containing gas. The fuel gas outlet manifold holes 20b are used to discharge the fuel gas (reactant gas), for example, hydrogen-containing gas.

In each of the first metal separator 14 and the second metal separator 16, reactant gas manifold holes, namely, a fuel gas inlet manifold hole 20a and an oxidant gas outlet manifold hole 18b, are formed at the other end portion in the arrow B direction so that the fuel gas inlet manifold hole 20a and the oxidant gas outlet manifold hole 18b are aligned in the arrow C direction. The fuel gas inlet manifold hole 20a of the first metal separator 14 and the fuel gas inlet manifold hole 20a of the second metal separator 16 are in communication with each other in the arrow A direction. The oxidant gas outlet manifold hole 18b of the first metal separator 14 and the oxidant gas outlet manifold hole 18b of the second metal separator 16 are in communication with each other in the arrow A direction. The fuel gas inlet manifold holes 20a are used to supply fuel gas and the oxidant gas outlet manifold holes 18b are used to discharge the oxidant gas.

In each of the first metal separator 14 and the second metal separator 16, two cooling medium inlet manifold holes 22a are respectively formed at an upper end portion and a lower end portion in the short side direction (arrow C direction) on the side close to the oxidant gas inlet manifold hole 18a. The cooling medium inlet manifold holes 22a of the first metal separator 14 are in communication with the cooling medium inlet manifold holes 22a of the second metal separator 16 in the arrow A direction. In each of the first metal separator 14 and the second metal separator 16, two cooling medium outlet manifold holes 22b are respectively formed at an upper end portion and a lower end portion in the short side direction on the side close to the fuel gas inlet manifold hole 20a. The cooling medium outlet manifold holes 22b of the first metal separator 14 are in communication with the cooling medium outlet manifold holes 22b of the second metal separator 16 in the arrow A direction. The cooling medium inlet manifold holes 22a are used in pair to supply the cooling medium and the cooling medium outlet manifold holes 22b are used in pair to discharge the cooling medium.

Figure 3:
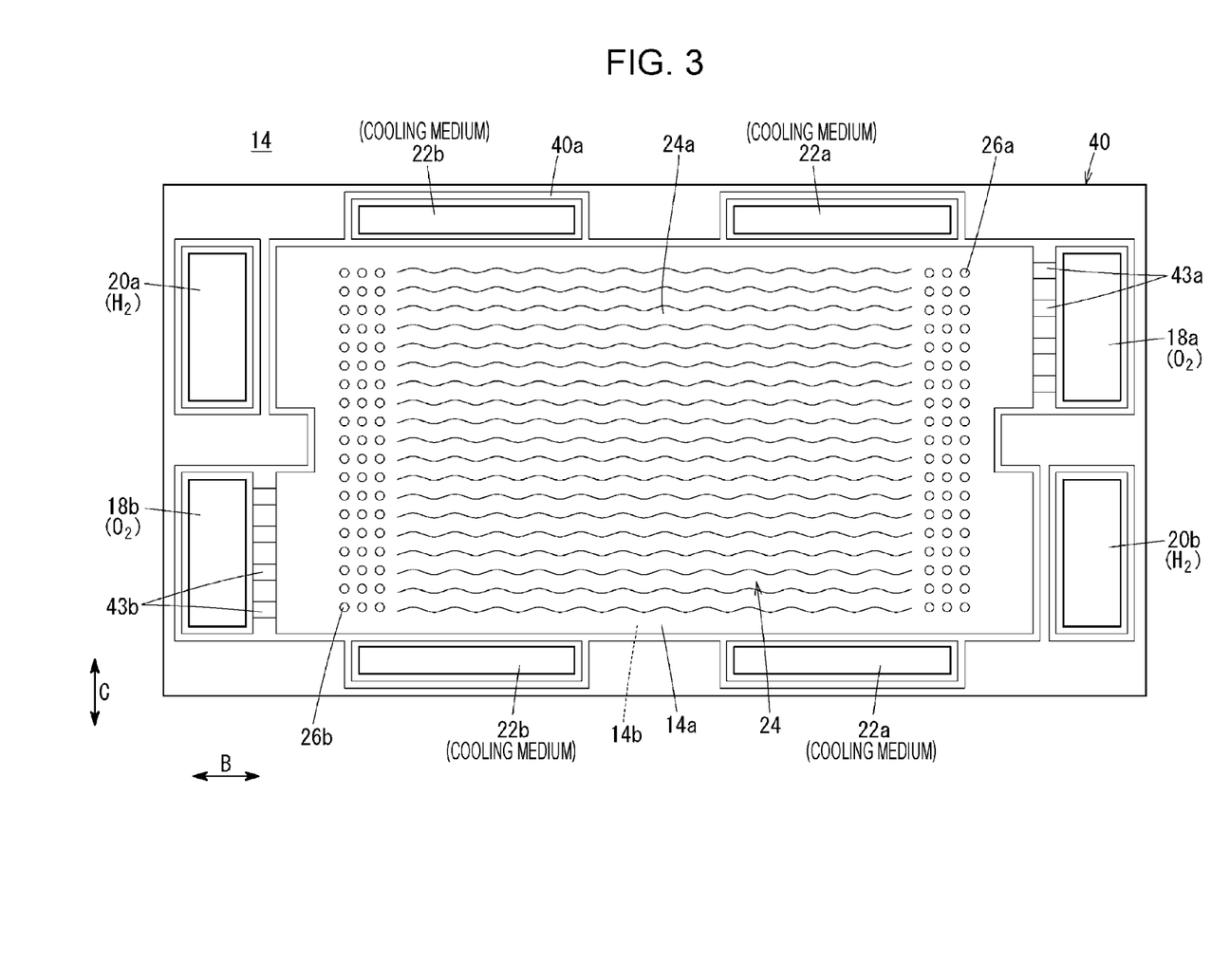
FIG. 3 is a front view of a metal separator constituting the power generation cell.

As illustrated in FIG. 3, an oxidant gas flow channel 24 that extends in the arrow B direction, for example, is formed in a surface 14a of the first metal separator 14. The surface 14a is a surface that faces the resin-framed MEA 12. The oxidant gas flow channel 24 includes multiple wavy grooves (or linear grooves) 24a parallel to one another.

An inlet buffer portion 26a is disposed in the inlet-side end portion of the oxidant gas flow channel 24. The inlet buffer portion 26a is located outside the power generation region. An outlet buffer portion 26b is disposed in the outlet-side end portion of the oxidant gas flow channel 24. The outlet buffer portion 26b is also outside the power generation region.

The inlet buffer portion 26a and the outlet buffer portion 26b each have multiple embosses protruding toward the resin-framed MEA 12. Alternatively, multiple linear projections may be provided together with or instead of the embosses. The embosses of the inlet buffer portion 26a and the outlet buffer portion 26b and embosses on a surface 14b (surface facing a cooling medium flow channel 38) of the first metal separator 14 are provided in an alternating manner.

As illustrated in FIG. 1, a fuel gas flow channel 32 that extends in the arrow B direction, for example, is formed in a surface 16a of the second metal separator 16. The surface 16a is a surface that faces the resin-framed MEA 12. The fuel gas flow channel 32 includes multiple wavy grooves (or linear grooves) 32a that are parallel to one another.

An inlet buffer portion 34a is disposed at an inlet-side end portion of the fuel gas flow channel 32. The inlet buffer portion 34a is located outside the power generation region. An outlet buffer portion 34b is disposed at an outlet-side end portion of the fuel gas flow channel 32. The outlet buffer portion 34b is located outside the power generation region.

The inlet buffer portion 34a and the outlet buffer portion 34b each have multiple embosses protruding toward the resin-framed MEA 12. Alternatively, multiple linear projections may be formed together with or instead of the embosses. The embosses of the inlet buffer portion 34a and the outlet buffer portion 34b and embosses on a surface 16b (surface facing the cooling medium flow channel 38) of the second metal separator 16 are provided in an alternating manner.

Multiple supply holes (through holes) 36a are formed near the fuel gas inlet manifold hole 20a. Multiple discharge holes (through holes) 36b are formed near the fuel gas outlet manifold hole 20b.

A cooling medium flow channel 38 is formed between the surface 14b of the first metal separator 14 and the surface 16b of the second metal separator 16 adjacent to each other. The cooling medium flow channel 38 is in communication with the cooling medium inlet manifold holes 22a and the cooling medium outlet manifold holes 22b. The cooling medium flow channel 38 is formed as the rear-side shape of the oxidant gas flow channel 24 formed in the first metal separator 14 and the rear-side shape of the fuel gas flow channel 32 formed in the second metal separator 16 come together.

As illustrated in FIGS. 1 and 2, a first seal member 40 that covers a portion of the surface 14a and a portion of the surface 14b of the first metal separator 14 surrounds the outer peripheral end portions of the first metal separator 14. The first seal member 40 is integral. A second seal member 42 that covers a portion of the surface 16a and a portion of the surface 16b of the second metal separator 16 surrounds the outer peripheral end portions of the second metal separator 16. The second seal member 42 is also integral.

Referring to FIGS. 2 and 3, the first seal member 40 includes a protruding seal 40a disposed on the surface 14a and arranged to contact a flat surface of the second seal member 42 on the adjacent second metal separator 16.

Referring to FIG. 3, the protruding seal 40a surrounds the oxidant gas flow channel 24, the oxidant gas inlet manifold hole 18a, and the oxidant gas outlet manifold hole 18b. Multiple inlet passages 43a are formed near the oxidant gas inlet manifold hole 18a by cutting-out the protruding seal 40a. Multiple outlet passages 43b are formed near the oxidant gas outlet manifold hole 18b by cutting-out the protruding seal 40a.

The oxidant gas inlet manifold hole 18a and the oxidant gas flow channel 24 are in communication with each other via the inlet passages 43a. The oxidant gas outlet manifold hole 18b and the oxidant gas flow channel 24 are in communication with each other via the outlet passages 43b.

Referring to FIGS. 1 and 2, the second seal member 42 includes a protruding seal 42a disposed on the surface 16a. The protruding seal 42a on surface 16a surrounds the supply holes 36a, the discharge holes 36b, and the fuel gas flow channel 32 and so that they are in communication with each other.

Examples of the first seal member 40 and the second seal member 42 include elastic seal members such as sealing materials, cushion materials, and packing materials formed of EPDM, NBR, fluororubber, silicone rubber, fluorosilicone rubber, butyl rubber, natural rubber, styrene rubber, chloroprene rubber, and acryl rubber.

Figure 4:
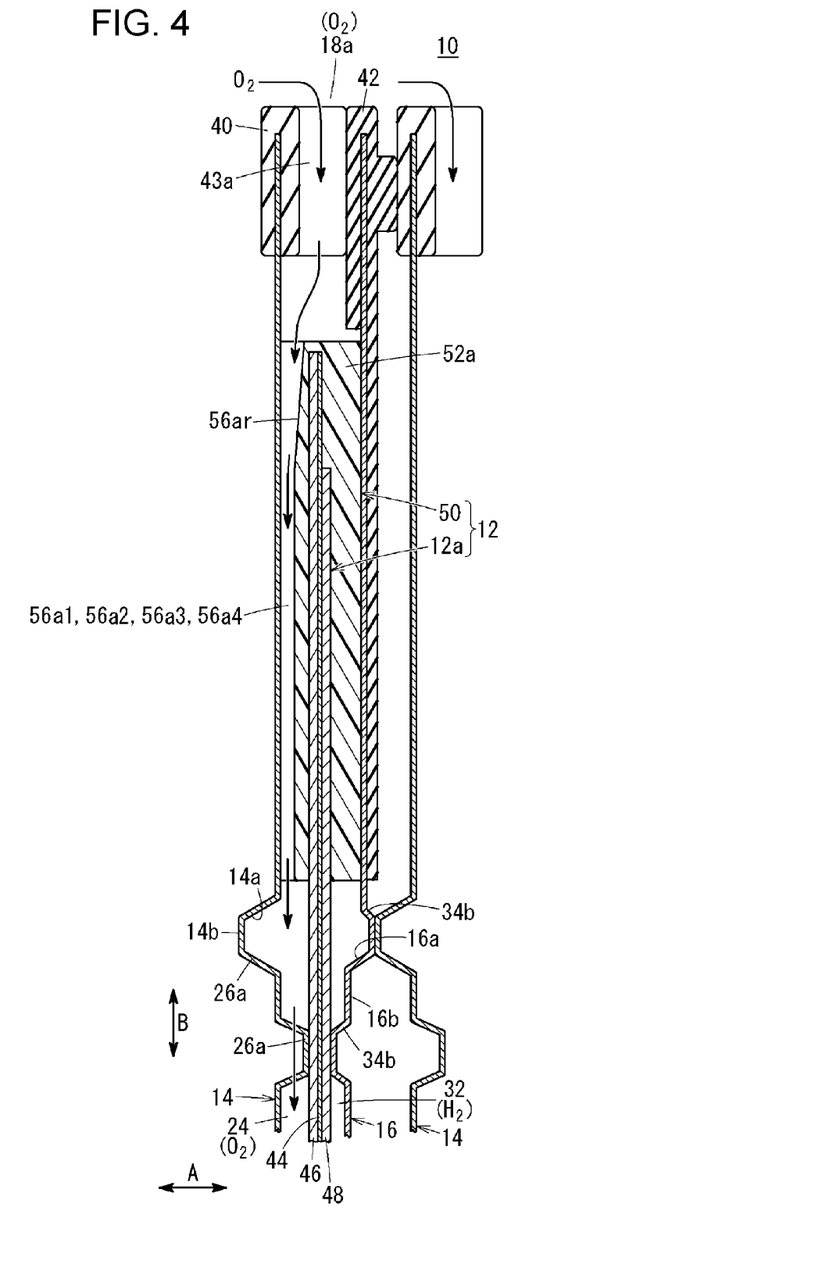
FIG. 4 is a sectional view of the power generation cell taken along line IV-IV in FIG. 1.
Figure 5:
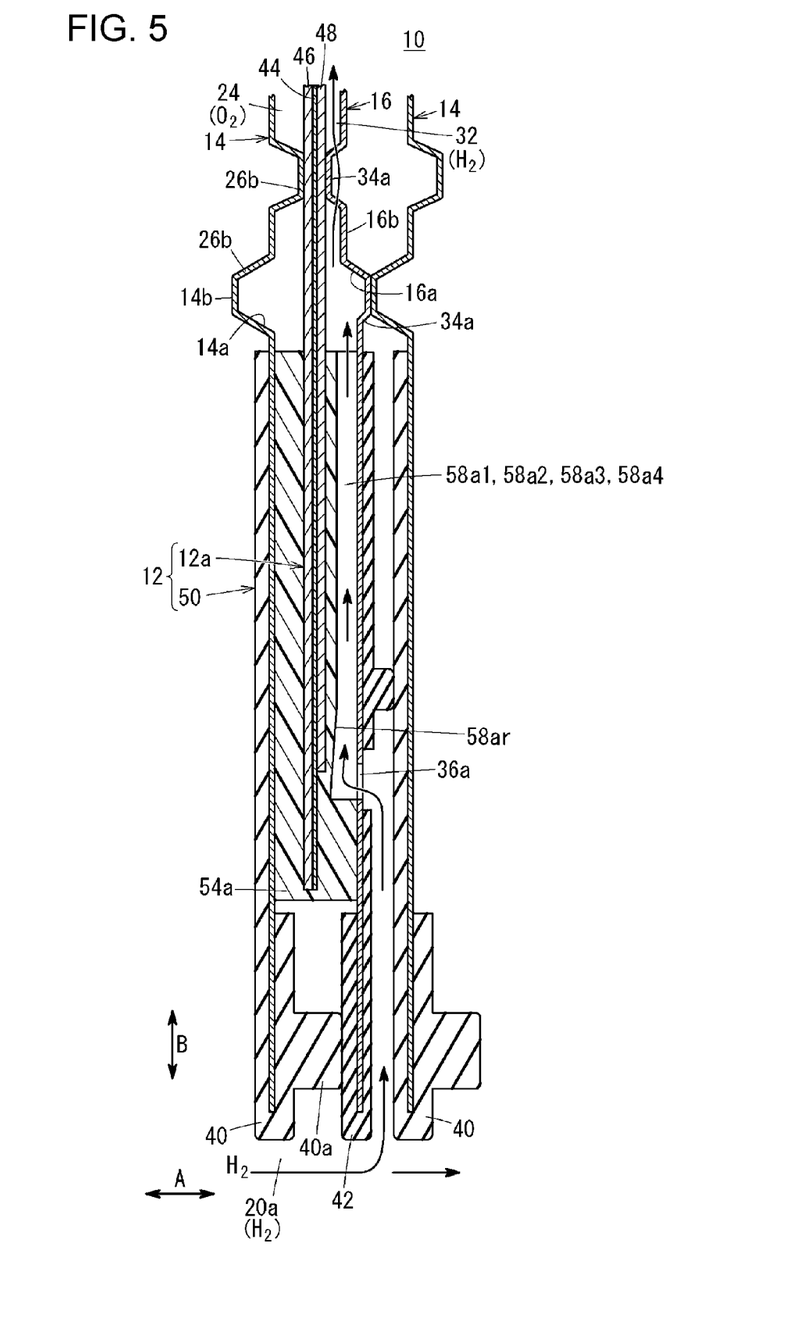
FIG. 5 is a sectional view of the power generation cell taken along line V-V in FIG. 1.

As illustrated in FIGS. 2, 4, and 5, the resin-framed MEA 12 includes a MEA 12a, which is a stepped MEA. A stepped MEA is a type of MEA that has a difference in level (step), in other words, a MEA in which one of the electrodes has a different size from the other electrode in plan. The details are provided below.

The MEA 12a includes, for example, a solid polymer electrolyte membrane (cation exchange membrane) 44, which is a water-impregnated perfluorosulfonic acid thin membrane. A cathodic electrode 46 is disposed on one of the surfaces of the solid polymer electrolyte membrane 44. An anodic electrode 48 is disposed on the other surface of the solid polymer electrolyte membrane 44. The solid polymer electrolyte membrane 44 may be a fluorine-based electrolyte or hydrocarbon (HC)-based electrolyte.

The dimension of the anodic electrode 48 in plan (outer dimension) is smaller than the dimensions of the solid polymer electrolyte membrane 44 and the cathodic electrode 46 in plan (outer dimensions). The cathodic electrode 46 and the solid polymer electrolyte membrane 44 are designed to have the same dimension in plan.

Alternatively, the cathodic electrode 46 may be designed to have a smaller dimension than the solid polymer electrolyte membrane 44 and the anodic electrode 48 in plan. The MEA 12a is not limited to the stepped MEA and the anodic electrode 48 and the cathodic electrode 46 may be designed to have the same dimension in plan.

The cathodic electrode 46 and the anodic electrode 48 each include a gas diffusion layer (not illustrated) formed of carbon paper or the like and an electrode catalyst layer (not illustrated) formed by evenly applying porous carbon particles having surfaces supporting a platinum alloy onto a surface of the gas diffusion layer. The electrode catalyst layer is formed on each surface of the solid polymer electrolyte membrane 44.

The resin-framed MEA 12 includes a resin frame member 50 that surrounds and is joined to the outer periphery of the solid polymer electrolyte membrane 44.

The resin frame member 50 is formed of, for example, polyphenylene sulfide (PPS), polyphthalamide (PPA), polyethylene naphthalate (PEN), polyether sulfone (PES), liquid crystal polymer (LCP), polyvinylidene fluoride (PVDF), silicone resin, fluororesin, modified polyphenylene ether (m-PPE) resin, polyethylene terephthalate (PET), polybutylene terephthalate (PBT), and modified polyolefin.

As illustrated in FIGS. 1, 2, 4, and 5, the resin frame member 50 has an angled-U cross-sectional shape and covers the outer peripheral end portion of the MEA 12a. Since the MEA 12a constitutes the stepped MEA, the resin frame member 50 having an angled-U shape can be firmly joined to the MEA 12a.

As illustrated in FIG. 1, an oxidant gas inlet bridge portion (projection) 52a and an oxidant gas outlet bridge portion (projection) 52b that project in the outer arrow B direction are formed at diagonal positions of the resin frame member 50. A fuel gas inlet bridge portion (projection) 54a and a fuel gas outlet bridge portion (projection) 54b that protrude in the outer arrow B direction are formed at other diagonal positions of the resin frame member 50.

The oxidant gas inlet bridge portion 52a is on a surface 50a of the resin frame member 50 and contacts the first metal separator 14. In the oxidant gas inlet bridge portion 52a, oxidant gas inlet connecting flow channels 56a1, 56a2, 56a3, and 56a4 that connect the oxidant gas inlet manifold hole 18a to the inlet buffer portion 26a (refer to FIG. 3) are formed.

The oxidant gas inlet connecting flow channels 56a1 to 56a4 are formed of grooves formed by cutting-out a surface of the oxidant gas inlet bridge portion 52a into slits that are parallel to each other in the vertical direction and each extend in the arrow B direction. In FIGS. 1 and 4, four oxidant gas inlet connecting flow channels 56a1 to 56a4 are illustrated but the number of the flow channels can be increased or decreased depending on the need.

As illustrated in FIG. 4, a sloped surface 56ar is formed at the bottom of each of the oxidant gas inlet connecting flow channels 56a1 to 56a4. The sloped surface 56ar has a tapered shape formed such that the depth of the flow channel decreases continuously as it extends from the oxidant gas inlet manifold hole 18a to the oxidant gas flow channel 24. The sloped surface 56ar may be formed through out the entire length of each of the oxidant gas inlet connecting flow channels 56a1 to 56a4 or may be formed up to a certain point in each of the oxidant gas inlet connecting flow channels 56a1 to 56a4 (refer to FIG. 4).

As illustrated in FIG. 1, the oxidant gas outlet bridge portion 52b is on the surface 50a of the resin frame member 50 and contacts the first metal separator 14. In the oxidant gas outlet bridge portion 52b, oxidant gas outlet connecting flow channels 56b1, 56b2, 56b3, and 56b4 that connect the oxidant gas outlet manifold hole 18b to the outlet buffer portion 26b are formed.

The oxidant gas outlet connecting flow channels 56b1 to 56b4 are formed of grooves formed by cutting-out a surface of the oxidant gas outlet bridge portion 52b into slits that are parallel to each other in the vertical direction and each extend in the arrow B direction. In FIG. 1, four oxidant gas outlet connecting flow channels 56b1 to 56b4 are illustrated but the number of the flow channels can be increased or decreased depending on the need.

A sloped surface 56br is formed at the bottom of each of the oxidant gas outlet connecting flow channels 56b1 to 56b4. The sloped surface 56br has a tapered shape formed such that the depth of the flow channel decreases continuously as it extends from the oxidant gas outlet manifold hole 18b toward the oxidant gas flow channel 24. The sloped surface 56br may be formed through out the entire length of each of the oxidant gas outlet connecting flow channels 56b1 to 56b4 or may be formed up to a certain point in each of the oxidant gas outlet connecting flow channels 56b1 to 56b4.

Figure 6:
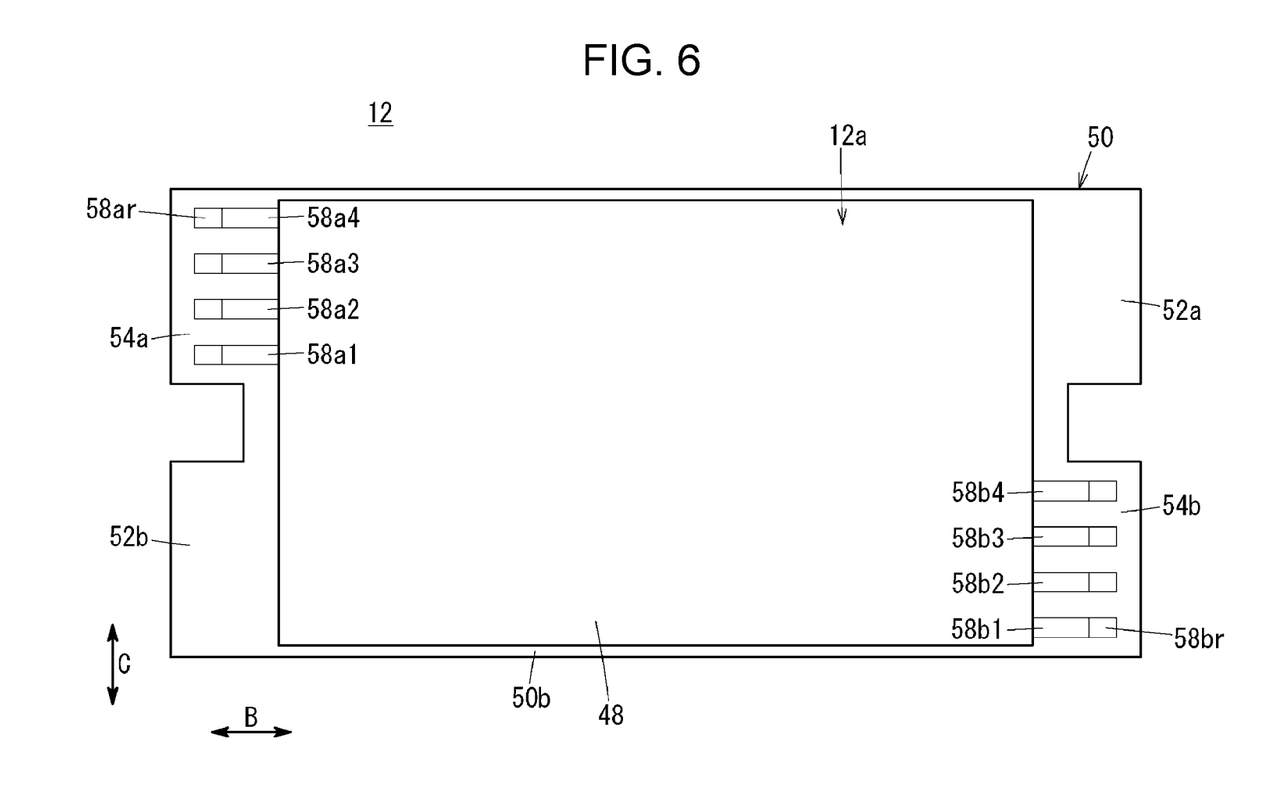
FIG. 6 is a front view of a resin-framed MEA constituting the power generation cell.

As illustrated in FIG. 1, the fuel gas inlet bridge portion 54a is disposed on another surface 50b of the resin frame member 50 and contacts the second metal separator 16. As illustrated in FIGS. 5 and 6, fuel gas inlet connecting flow channels 58a1, 58a2, 58a3, and 58a4 that connect the fuel gas inlet manifold hole 20a to the inlet buffer portion 34a are formed in the fuel gas inlet bridge portion 54a.

The fuel gas inlet connecting flow channels 58a1 to 58a4 are formed of grooves formed by cutting-out a surface of the fuel gas inlet bridge portion 54a into slits that are parallel to each other in the vertical direction and each extend in the arrow B direction. The fuel gas inlet connecting flow channels 58a1 to 58a4 are placed away from the outer peripheral end portion of the fuel gas inlet bridge portion 54a toward the inner side. Although four fuel gas inlet connecting flow channels 58a1 to 58a4 are illustrated in FIG. 6, the number of the flow channels may be increased or decreased depending on the need.

As illustrated in FIG. 5, a sloped surface 58ar is formed at the bottom of each of the fuel gas inlet connecting flow channels 58a1 to 58a4. The sloped surface 58ar has a tapered shape formed such that the depth of the flow channel continuously decreases as it extends from the fuel gas inlet manifold hole 20a toward the fuel gas flow channel 32. The sloped surface 58ar may be formed through out the entire length of each of the fuel gas inlet connecting flow channels 58a1 to 58a4 or may be formed up to a certain point in each of the fuel gas inlet connecting flow channels 58a1 to 58a4 (refer to FIG. 5).

As illustrated in FIG. 1, the fuel gas outlet bridge portion 54b is disposed on another surface 50b of the resin frame member 50 and in contact with the second metal separator 16. As illustrated in FIG. 6, fuel gas outlet connecting flow channels 58b1, 58b2, 58b3, and 58b4 that connect the fuel gas outlet manifold hole 20b to the outlet buffer portion 34b are formed in the fuel gas outlet bridge portion 54b.

The fuel gas outlet connecting flow channels 58b1 to 58b4 are formed of grooves formed by cutting-out a surface of the fuel gas outlet bridge portion 54b into slits that are parallel to each other in the vertical direction and each extend in the arrow B direction. The fuel gas outlet connecting flow channels 58b1 to 58b4 are placed away from the outer peripheral end portion of the fuel gas outlet bridge portion 54b toward the inner side. Although four fuel gas outlet connecting flow channels 58b1 to 58b4 are illustrated in FIG. 6, the number of flow channels may be increased or decreased depending on the need.

A sloped surface 58br is formed at the bottom of each of the fuel gas outlet connecting flow channels 58b1 to 58b4. The sloped surface 58br has a tapered shape formed such that the depth of the flow channel continuously decreases as it extends from the fuel gas outlet manifold hole 20b toward the fuel gas flow channel 32. The sloped surface 58br may be formed through out the entire length of each of the fuel gas outlet connecting flow channels 58b1 to 58b4 or may be formed up to a certain point in each of the fuel gas outlet connecting flow channels 58b1 to 58b4.

As illustrated in FIG. 2, the resin frame member 50 is joined to the first metal separator 14 in contact with the surface 50a by using an adhesive 60a. The resin frame member 50 is joined to the second metal separator 16 in contact with the surface 50b by using an adhesive 60b. The adhesives 60a and 60b may be a liquid seal or a hot melt agent. Alternatively, only one of the adhesives 60a and 60b may be used.

The structure of the resin frame member 50 is not limited to one described above and resin frame members with various shapes can be used. A resin frame member may be joined to the outer periphery of the MEA 12a so as to constitute the resin-framed MEA 12.

Operation of the power generation cell 10 configured as such will now be described.

First, as illustrated in FIG. 1, oxidant gas such as oxygen-containing gas is supplied through the oxidant gas inlet manifold hole 18a and fuel gas such as hydrogen-containing gas is supplied through the fuel gas inlet manifold hole 20a. A cooling medium such as pure water, ethylene glycol, or oil is supplied through the cooling medium inlet manifold holes 22a that form a pair and are aligned in the vertical direction.

As illustrated in FIGS. 3 and 4, the oxidant gas is supplied to the inlet passages 43a of the first metal separator 14 through the oxidant gas inlet manifold hole 18a. The oxidant gas inlet bridge portion 52a of the resin frame member 50 is adjacent to the downstream of the inlet passages 43a.

As a result, as illustrated in FIG. 4, the oxidant gas flows through the oxidant gas inlet connecting flow channels 56a1 to 56a4 of the oxidant gas inlet bridge portion 52a and is introduced into the oxidant gas flow channel 24 through the inlet buffer portion 26a. As illustrated in FIG. 1, the oxidant gas moves along the oxidant gas flow channel 24 in the arrow B direction and is supplied to the cathodic electrode 46 of the MEA 12a.

As illustrated in FIGS. 1 and 5, the fuel gas is supplied to the surface 16b of the second metal separator 16 through the fuel gas inlet manifold hole 20a. The fuel gas passes through the supply holes 36a and is supplied to the surface 16a. The fuel gas inlet bridge portion 54a of the resin frame member 50 is in contact with the surface 16a and overlaps the supply holes 36a and the fuel gas inlet connecting flow channels 58a1 to 58a4 are formed in the fuel gas inlet bridge portion 54a.

As a result, as illustrated in FIG. 5, the fuel gas flows thorough the fuel gas inlet connecting flow channels 58a1 to 58a4 and is introduced to the fuel gas flow channel 32 through the inlet buffer portion 34a. Thus, the fuel gas moves along the fuel gas flow channel 32 in the arrow B direction and is supplied to the anodic electrode 48 of the MEA 12a.

As a result, in the MEA 12a, the oxidant gas supplied to the cathodic electrode 46 and the fuel gas supplied to the anodic electrode 48 are consumed in the electrode catalyst layers by electrochemical reactions and power is generated.

The oxidant gas supplied to the cathodic electrode 46 and partly consumed flows through the oxidant gas outlet connecting flow channels 56b1 to 56b4 from the outlet buffer portion 26b of the first metal separator 14, as illustrated in FIGS. 1 and 3. The oxidant gas is discharged to the oxidant gas outlet manifold hole 18b and distributed in the arrow A direction.

Similarly, the fuel gas supplied to the anodic electrode 48 and partly consumed flows through the fuel gas outlet connecting flow channels 58b1 to 58b4 from the outlet buffer portion 34b of the second metal separator 16, as illustrated in FIGS. 1 and 6. The fuel gas is then discharged to the fuel gas outlet manifold hole 20b through the discharge holes 36b and distributed in the arrow A direction.

As illustrated in FIG. 1, the cooling medium supplied through the cooling medium inlet manifold holes 22a forming a pair and aligned in the vertical direction is introduced into the cooling medium flow channel 38 between the first metal separator 14 and the second metal separator 16. The cooling medium is supplied to the cooling medium flow channel 38 through the cooling medium inlet manifold hole 22a, flows along the inner arrow C direction temporarily, and then moves in the arrow B direction to cool the resin-framed MEA 12. The cooling medium moves in the outer arrow C direction and then is discharged through the cooling medium outlet manifold holes 22b forming a pair and aligned in the vertical direction.

In this case, in the first embodiment, as illustrated in FIG. 1, the oxidant gas inlet connecting flow channels 56a1, 56a2, 56a3, and 56a4 are formed in the oxidant gas inlet bridge portion 52a of the resin frame member 50. As illustrated in FIG. 4, a sloped surface 56ar is formed at the bottom of each of the oxidant gas inlet connecting flow channels 56a1 to 56a4.

The sloped surface 56ar has a tapered shape formed such that the depth of the flow channel continuously decreases as it extends from the oxidant gas inlet manifold hole 18a toward the oxidant gas flow channel 24. Thus, the oxidant gas supplied through the oxidant gas inlet manifold hole 18a can reliably and smoothly flow into the oxidant gas inlet connecting flow channels 56a1 to 56a4 along the sloped surfaces 56ar without disturbing the flow. Thus, the oxidant gas distribution property from the oxidant gas inlet bridge portion 52a to the inlet buffer portion 26a can be satisfactorily improved and the pressure loss can be decreased, which is advantageous.

The oxidant gas outlet connecting flow channels 56b1, 56b2, 56b3, and 56b4 are formed in the oxidant gas outlet bridge portion 52b of the resin frame member 50. The sloped surface 56br is formed at the bottom of each of the oxidant gas outlet connecting flow channels 56b1 to 56b4. According to this structure, the oxidant gas can be smoothly and reliably discharged through the oxidant gas outlet connecting flow channels 56b1 to 56b4 to the oxidant gas outlet manifold hole 18b without disturbing the flow, and the flow distribution property of the oxidant gas can be effectively improved and the pressure loss can be decreased.

As illustrated in FIG. 6, the fuel gas inlet connecting flow channels 58a1, 58a2, 58a3, and 58a4 are formed in the fuel gas inlet bridge portion 54a of the resin frame member 50. As illustrated in FIG. 5, the sloped surface 58ar is formed at the bottom of each of the fuel gas inlet connecting flow channels 58a1 to 58a4.

The sloped surface 58ar has a tapered shape formed such that the depth of the flow channel continuously decreases as it extends from the fuel gas inlet manifold hole 20a toward the fuel gas flow channel 32. Thus, the fuel gas supplied through the fuel gas inlet manifold hole 20a can smoothly and reliably flow into the fuel gas inlet connecting flow channels 58a1 to 58a4 along the sloped surfaces 58ar. As a result, the flow distribution property of the fuel gas from the fuel gas inlet bridge portion 54a to the inlet buffer portion 34a can be satisfactorily improved and the pressure loss can be decreased, which is advantageous.

The fuel gas outlet connecting flow channels 58b1, 58b2, 58b3, and 58b4 are formed in the fuel gas outlet bridge portion 54b of the resin frame member 50. The sloped surface 58br is formed at the bottom of each of the fuel gas outlet connecting flow channels 58b1 to 58b4. According to this structure, the fuel gas can be smoothly and reliably discharged from the fuel gas outlet connecting flow channels 58b1 to 58b4 to the fuel gas outlet manifold hole 20b without disturbing the flow. Thus, the flow distribution property of the fuel gas can be effectively improved and the pressure loss can be decreased.

Figure 7:
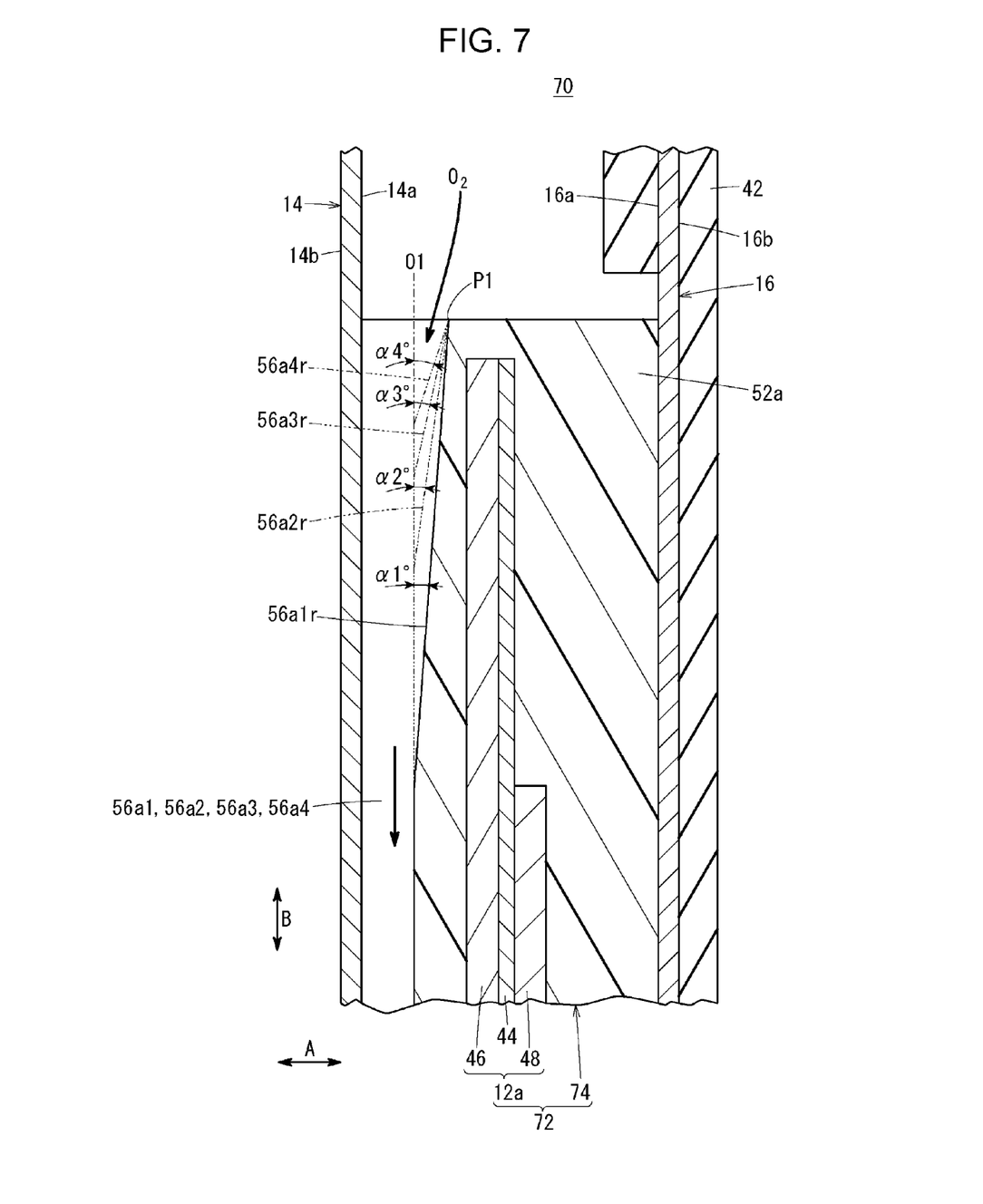
FIG. 7 is a sectional view of an oxidant gas inlet bridge portion of a power generation cell according to a second embodiment of the present application.
Figure 8:
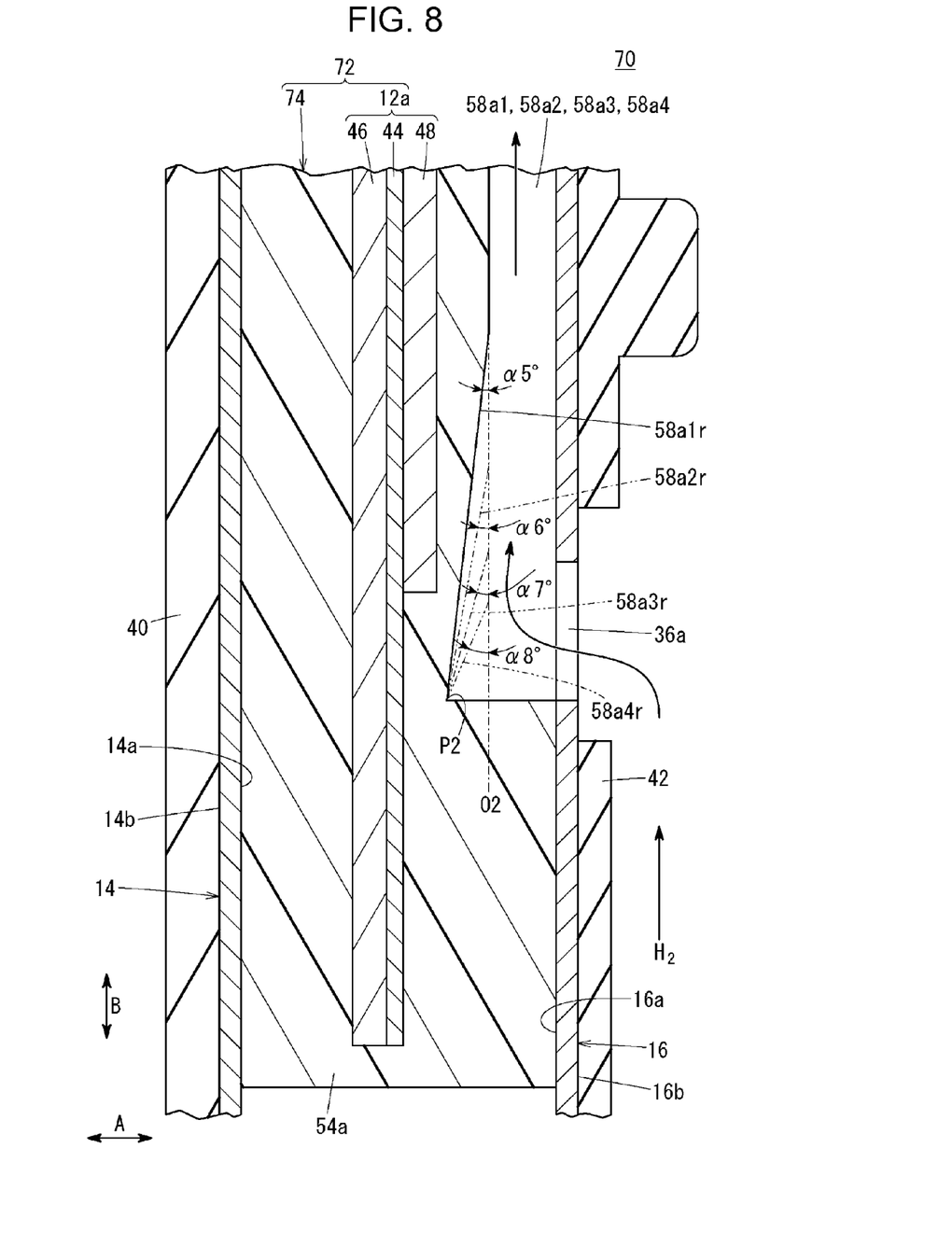
FIG. 8 is a sectional view of a fuel gas inlet bridge portion of the power generation cell.

FIG. 7 is a cross-sectional view of an oxidant gas inlet bridge portion 52a of a power generation cell (fuel cell) 70 according to a second embodiment. FIG. 8 is a cross-sectional view of a fuel gas inlet bridge portion 54a of the power generation cell 70.

The same constitutional elements as those of the power generation cell 10 of the first embodiment are represented by the same reference numerals and the detailed description thereof is omitted.

The power generation cell 70 is equipped with a resin-framed MEA 72. The resin-framed MEA 72 includes a MEA 12a and a resin frame member 74 joined to the MEA 12a. As illustrated in FIG. 7, oxidant gas inlet connecting flow channels 56a1, 56a2, 56a3, and 56a4 are formed in the oxidant gas inlet bridge portion 52a of the resin frame member 74. Sloped surfaces 56a1r, 56a2r, 56a3r, and 56a4r are respectively formed at the bottoms of the oxidant gas inlet connecting flow channels 56a1, 56a2, 56a3, and 56a4.

The sloped surfaces 56a1r, 56a2r, 56a3r, and 56a4r are sloped at angles of α1°, α2°, α3°, and α4°, respectively, with respect to the reference line O1 that extends in the arrow B direction. These slopes start from the same starting point P1. The slope angles α1°, α2°, α3°, and α4° are preferably in the ascending order. The sloped surface 56a1r is closest to the center and the sloped surface 56a4r is farthest to the center. The slope angles α1°, α2°, α3°, and α4° are set based on the oxidant gas flow rate, the flow distribution state, etc., in the oxidant gas inlet connecting flow channels 56a1, 56a2, 56a3, and 56a4. In other words, the angles illustrated in the drawing are set for the sake of convenience and visibility and are not limiting.

As illustrated in FIG. 8, fuel gas inlet connecting flow channels 58a1, 58a2, 58a3, and 58a4 are formed in a fuel gas inlet bridge portion 54a of the resin frame member 74. Sloped surfaces 58a1r, 58a2r, 58a3r, and 58a4r are respectively formed at the bottoms of the fuel gas inlet connecting flow channels 58a1, 58a2, 58a3, and 58a4.

The sloped surfaces 58a1r, 58a2r, 58a3r, and 58a4r are sloped at angles of α5°, α6°, α7°, and α8° with respect to the reference line O2 that extends in the arrow B direction. These slopes start from the same starting point P2. The slope angles α5° to α8° are preferably in the ascending order. The sloped surface 58a1r is closest to the center and the sloped surface 58a4r is farthest to the center. The slope angles α5°, α6°, α7°, and α8° are set based on the fuel gas flow rate, the flow distribution state, etc., of the fuel gas in the fuel gas inlet connecting flow channels 58a1, 58a2, 58a3, and 58a4. In other words, the angles illustrated in the drawing are set for the sake of convenience and visibility and are not limiting.

Oxidant gas outlet connecting flow channels 56b1 to 56b4 are formed in an oxidant gas outlet bridge portion 52b of the resin frame member 74. The oxidant gas outlet connecting flow channels 56b1 to 56b4 have the same structure as the oxidant gas inlet connecting flow channels 56a1 to 56a4. Fuel gas outlet connecting flow channels 58b1 to 58b4 are formed in a fuel gas outlet bridge portion 54b of the resin frame member 74. The fuel gas outlet connecting flow channels 58b1 to 58b4 have the same structure as the fuel gas inlet connecting flow channels 58a1 to 58a4.

According to the second embodiment having this structure, as illustrated in FIG. 7, the oxidant gas inlet connecting flow channels 56a1 to 56a4 are formed in the oxidant gas inlet bridge portion 52a of the resin frame member 74. Then the sloped surfaces 56a1r to 56a4r respectively having different slope angles α1° to α4° are formed at the bottoms of the oxidant gas inlet connecting flow channels 56a1 to 56a4.

Thus, the oxidant gas supplied through the oxidant gas inlet manifold hole 18a can smoothly and reliably flow into the oxidant gas inlet connecting flow channels 56a1 to 56a4 by moving along the sloped surfaces 56a1r to 56a4r. As a result, the oxidant gas flow distribution property from the oxidant gas inlet bridge portion 52a to the inlet buffer portion 26a can be satisfactorily improved, which is advantageous.

Furthermore, as illustrated in FIG. 8, the fuel gas inlet connecting flow channels 58a1 to 58a4 are formed in the fuel gas inlet bridge portion 54a of the resin frame member 74. The sloped surfaces 58a1r to 58a4r respectively having different slope angles α5° to α8° are formed at the bottoms of the fuel gas inlet connecting flow channels 58a1 to 58a4.

As a result, the flow distribution property is improved and the fuel gas supplied through the fuel gas inlet manifold hole 20a can smoothly and reliably flow into the fuel gas inlet connecting flow channels 58a1 to 58a4 as it flows along the sloped surfaces 58a1r to 58a4r. Thus, the fuel gas flow distribution property from the fuel gas inlet bridge portion 54a to the inlet buffer portion 34a can be satisfactorily improved.

The power generation cells 10 and 70 each include one MEA and a pair of separators holding the MEA; however, the structure is not limited to this. For example, a fuel cell having a curtailed cooling structure may be employed, which includes power generation units (fuel cells) each formed of a first metal separator, a first resin-framed MEA, a second metal separator, a second resin-framed MEA, and a third separator stacked in that order, and a cooling medium flow channel disposed between the power generation units.

A fuel cell described in the present application includes a resin-framed membrane-electrode assembly (MEA) and separators stacked on two sides of the resin-framed MEA. The resin-framed MEA includes a solid polymer electrolyte membrane, electrodes disposed on both surfaces of the solid polymer electrolyte membrane, and a resin frame member that surrounds an outer periphery of the solid polymer electrolyte membrane.

The separators each include a reactant gas flow channel through which reactant gas is distributed along an electrode surface and a reactant gas manifold hole through which the reactant gas is distributed in a stacking direction of the resin-framed membrane electrode assembly and the separators. The resin frame member includes a bridge portion that connects the reactant gas flow channel to the reactant gas manifold hole. The bridge portion includes multiple connecting flow channels that connect the reactant gas flow channel to the reactant gas manifold hole. The connecting flow channels each have a sloped surface at a bottom thereof.

In this fuel cell, a slope angle of the sloped surface is preferably different for every connecting flow channel.

In this fuel cell, the sloped surface is preferably formed such that a depth of the connecting flow channel continuously decreases as the connecting flow channel extends from the reactant gas manifold hole toward the reactant gas flow channel.

According to the above-described structure, because sloped surfaces are formed at the bottoms of the connecting flow channels of the bridge portion in the resin frame member, the reactant gas can smoothly flow into the connecting flow channels. Thus, the flow distribution property of the reactant gas from the bridge portion can be satisfactorily improved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a resin-framed membrane electrode assembly that includes a solid polymer electrolyte membrane, electrodes disposed on both surfaces of the solid polymer electrolyte membrane, and a resin frame member that surrounds an outer periphery of the solid polymer electrolyte membrane; and
   separators stacked on two sides of the resin-framed membrane electrode assembly,
   wherein each of the separators includes a reactant gas flow channel through which reactant gas is distributed along an electrode surface and a reactant gas manifold hole through which the reactant gas is distributed in a stacking direction of the resin-framed membrane electrode assembly and the separators,
   the resin frame member includes a bridge portion that connects the reactant gas flow channel to the reactant gas manifold hole,
   the bridge portion includes a plurality of connecting flow channels that connect the reactant gas flow channel to the reactant gas manifold hole, and
   the connecting flow channels each have a sloped surface at a bottom thereof.

2. The fuel cell according to claim 1, wherein a slope angle of the sloped surface is different for every connecting flow channel.

3. The fuel cell according to claim 1, wherein the sloped surface is formed such that a depth of the connecting flow channel continuously decreases as the connecting flow channel extends from the reactant gas manifold hole toward the reactant gas flow channel.

4. A fuel cell comprising:
a resin-framed membrane electrode assembly comprising:
- a solid polymer electrolyte membrane;
- first and second electrodes sandwiching the solid polymer electrolyte membrane therebetween in a stacking direction; and
- a resin frame member provided to surround an outer periphery of the solid polymer electrolyte membrane;

first and second separators sandwiching the resin-framed membrane electrode assembly therebetween in the stacking direction to define a reactant gas flow channel between each of the first and second separators and the resin-framed membrane electrode assembly, the first and second separators including a reactant gas manifold hole which passes through the first and second separators in the stacking direction; and the resin frame member including a bridge portion having connecting flow channels connecting the reactant gas flow channel and the reactant gas manifold hole, at least one of the connecting flow channels having a sloped surface along a flow direction of reactant gas from the reactant gas manifold hole toward the reactant gas flow channel.

5. The fuel cell according to claim 4, wherein a slope angle of the sloped surface is different for every connecting flow channel.

6. The fuel cell according to claim 4, wherein the sloped surface is formed such that a depth of the connecting flow channel continuously decreases as the connecting flow channel extends from the reactant gas manifold hole toward the reactant gas flow channel.

7. The fuel cell according to claim 4, wherein the at least one of the connecting flow channels having the sloped surface at a bottom thereof.

* * * * *